(12) United States Patent
Kenmochi et al.

(10) Patent No.: US 8,950,878 B2
(45) Date of Patent: Feb. 10, 2015

(54) VEHICLE DOOR MIRROR

(75) Inventors: Kenji Kenmochi, Miyazaki (JP); Tomoyuki Kukita, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 195 days.

(21) Appl. No.: 13/807,976

(22) PCT Filed: Apr. 15, 2011

(86) PCT No.: PCT/JP2011/059362
§ 371 (c)(1),
(2), (4) Date: Mar. 12, 2013

(87) PCT Pub. No.: WO2012/008193
PCT Pub. Date: Jan. 19, 2012

(65) Prior Publication Data
US 2013/0194685 A1    Aug. 1, 2013

(30) Foreign Application Priority Data
Jul. 13, 2010    (JP) ................. 2010-158414

(51) Int. Cl.
*G02B 5/08* (2006.01)
*B60R 1/06* (2006.01)
*B60R 1/074* (2006.01)

(52) U.S. Cl.
CPC .. *B60R 1/06* (2013.01); *B60R 1/074* (2013.01)
USPC ...................................................... 359/841

(58) Field of Classification Search
CPC ........ B60R 1/072; B60R 1/074; B60R 1/076; B60R 1/078; B60R 1/06; B60R 1/0605; B60R 1/08; G02B 5/08

USPC ................. 359/841, 871, 872, 877
See application file for complete search history.

(56) References Cited

U.S. PATENT DOCUMENTS

| 5,557,476 A | 9/1996 | Oishi |
| 6,116,743 A * | 9/2000 | Hoek ........................... 359/871 |
| 6,877,867 B1 | 4/2005 | Murakami |
| 7,287,869 B2 | 10/2007 | Onuki |
| 7,427,142 B2 | 9/2008 | Onuki |
| 2008/0149803 A1 | 6/2008 | Yoshida et al. |

FOREIGN PATENT DOCUMENTS

| CN | 1115838 A | 1/1996 |
| CN | 1445113 A | 10/2003 |

(Continued)

OTHER PUBLICATIONS

Official Communication dated Aug. 15, 2014 issued over the corresponding Chinese Patent Application 2011800340879.

*Primary Examiner* — Euncha Cherry
(74) *Attorney, Agent, or Firm* — Carrier Blackman & Associates, P.C.; William D. Blackman; Joseph P. Carrier (57) ABSTRACT

A vehicle door mirror is provided in which an upward facing support seat and a support shaft rising from the support seat are fixedly provided on a side door side of a vehicle, a click mechanism is provided between opposing faces of the support seat and a bearing part provided on a bracket and pivotably supported on the support shaft, a coil spring is provided between a spring receiving member fixed to the support shaft and a flat spring receiving face formed on the bearing part, and a lubricant reservoir is formed on the spring receiving face. The lubricant reservoir has at least a first groove that continues so that one end is disposed closer to the center of the support shaft than the other end. Thus, a lubricant is always stably supplied to an area of the coil spring that is in sliding contact with the spring receiving face.

10 Claims, 4 Drawing Sheets

(56) References Cited

FOREIGN PATENT DOCUMENTS

| CN | 2697377 Y | 5/2005 |
|----|-----------|--------|
| EP | 1 555 160 A2 | 7/2005 |
| EP | 1 609 676 A1 | 12/2005 |
| JP | 61-012847 U | 1/1986 |
| JP | 62-148444 U | 9/1987 |
| JP | 05-037583 U | 5/1993 |
| JP | 2005-254969 A | 9/2005 |
| JP | 2009-090926 A | 4/2009 |

* cited by examiner

FIG.4

VEHICLE DOOR MIRROR

TECHNICAL FIELD

The present invention relates to a vehicle door mirror in which an upward facing support seat and a support shaft rising from the support seat are fixedly provided on a side door side of a vehicle, a click mechanism is provided between opposing faces of the support seat and a bearing part provided on a bracket supporting a mirror and pivotably supported on the support shaft, the click mechanism imparting a click feel to pivoting of the bracket, a coil spring is provided in a compressed state between a spring receiving member fixed to the support shaft and a flat spring receiving face formed on a face, on the opposite side to the support seat, of the bearing part, the coil spring pressing the bearing part toward the support seat side, and a lubricant reservoir that can be charged with a lubricant is formed on the spring receiving face.

BACKGROUND ART

An arrangement in which, when pivoting a bracket supporting a mirror around the axis of a support shaft fixedly provided on a side door side of a vehicle, in order to suppress the generation of an abnormal noise due to friction between a coil spring and a spring receiving face of the bracket, a lubricant is applied between the spring receiving face and the coil spring is disclosed in Patent Document 1. Furthermore, an arrangement in which a click mechanism is provided between a rotating seating face provided on a bracket and a seating face connectedly provided on a base of a support shaft so as to oppose the rotating seating face, and a lubricant reservoir for charging with a lubricant is formed on the rotating seating face is disclosed in Patent Document 2.

RELATED ART DOCUMENTS

Patent Documents

Patent Document 1: Japanese Utility Model Application Laid-open No. 62-148444 Patent Document 2: Japanese Utility Model Application Laid-open No. 61-12847

SUMMARY OF THE INVENTION

Problems to be Solved by the Invention

However, in the arrangement disclosed in Patent Document 1 above, a lubricant is only applied between the spring receiving face and the coil spring, and there is a possibility that the lubrication performance will be degraded by frequent pivoting of the bracket or the lubricant running away due to rain, etc. Forming a lubricant reservoir on a spring receiving seating face by employing the technique disclosed in Patent Document 2 could therefore be considered. However, the lubricant reservoir disclosed in Patent Document 2 is a semicircular recess having a diameter of on the order of 1.2 to 1.8 mm; due to displacement of the coil spring caused by rattling between the bracket and the coil spring it is impossible to always supply lubricant to the area of the coil spring that is in sliding contact with the spring receiving face, and friction between the spring receiving face and the coil spring increases, thus giving rise to a possibility that the spring receiving face and the coil spring will rub so as to generate an abnormal noise.

The present invention has been accomplished under such circumstances, and it is an object thereof to provide a vehicle door mirror in which a lubricant is always stably supplied to an area of a coil spring that is in sliding contact with a spring receiving face, thereby preventing the occurrence of an abnormal noise.

Means for Solving the Problems

In order to attain the above object, according to a first aspect of the present invention, there is provided a vehicle door mirror in which an upward facing support seat and a support shaft rising from the support seat are fixedly provided on a side door side of a vehicle, a click mechanism is provided between opposing faces of the support seat and a bearing part provided on a bracket supporting a mirror and pivotably supported on a base of the support shaft, the click mechanism imparting a click feel to pivoting of the bracket, a coil spring is provided in a compressed state between a spring receiving member fixed to the support shaft and a flat spring receiving face formed on a face, on the opposite side to the support seat, of the bearing part, the coil spring pressing the bearing part toward the support seat side, and a lubricant reservoir that can be charged with a lubricant is formed on the spring receiving face, characterized in that the lubricant reservoir has at least a first groove that continues so that one end is disposed closer to the center of the support shaft than the other end.

Further, according to a second aspect of the present invention, in addition to the first aspect, the first groove is formed so that a virtual line extending radially from the center of the support shaft diagonally intersects an intermediate part of the first groove.

According to a third aspect of the present invention, in addition to the second aspect, the first groove is formed into a curved shape.

According to a fourth aspect of the present invention, in addition to any one of the first to third aspects, the lubricant reservoir is formed from a plurality of the first grooves disposed at intervals in the peripheral direction of the spring receiving face, and an annular second groove that the other ends of the first grooves communicate with in common, and the second groove is formed on an outer peripheral part of the spring receiving face so as to be positioned further outside than the outer periphery of the coil spring.

Moreover, according to a fifth aspect of the present invention, in addition to any one of the first to fourth aspects, a tubular spring housing part is provided on the bracket, the spring housing part being connected to the outer peripheral edge of the spring receiving face at right angles and housing the coil spring, and a drain hole for draining water within the spring housing part is provided at a location, closest to the ground, of the spring housing part in a state in which the bracket is supported on the support shaft.

Effects of the Invention

In accordance with the first aspect of the present invention, since the lubricant reservoir formed on the spring receiving face has at least the first groove, and the first groove continues so that one end is disposed closer to the center of the support shaft than the other end, regardless of displacement of the coil spring caused by rattling between the bracket and the coil spring, lubricant can be always supplied to the area of the coil spring that is in sliding contact with the spring receiving face, friction between the spring receiving face and the coil spring decreases, and the occurrence of an abnormal noise caused by rubbing of the spring receiving face and the coil spring can be prevented.

Furthermore, in accordance with the second aspect of the present invention, since the first groove diagonally intersects the virtual line passing through the intermediate part thereof and extending radially from the center of the support shaft, if in the worst case the terminus of the coil spring is caught by the first groove, it is possible to prevent the generation of an abnormal noise when the coil spring returns by virtue of the spring reaction force. That is, when the first groove is one that lies along the virtual line extending radially from the center of the support shaft, if the terminus of the coil spring is caught by the first groove during pivoting of the bracket, there is a possibility that an abnormal noise will be generated when the coil spring returns by virtue of the spring reaction force, but since the first groove diagonally intersects the virtual line extending radially from the center of the support shaft, even if the terminus of the coil spring is caught by the first groove, the resistance force is dispersed and it is easily released, and it is therefore possible to suppress twisting of the coil spring due to it being caught, reduce the spring reaction force, and prevent the occurrence of an abnormal noise when the coil spring returns.

In accordance with the third aspect of the present invention, since the first groove has a curved shape, compared with a case in which the first groove has a straight line shape the length of the first groove is made longer, a larger amount of lubricant can be charged, and flowing out of the lubricant can be suppressed more effectively.

In accordance with the fourth aspect of the present invention, since the lubricant reservoir is formed from the plurality of first grooves and the annular second groove, which is formed on the outer peripheral part of the spring receiving face so as to make the other ends of the first grooves communicate in common therewith, and the second groove is positioned further outside than the outer periphery of the coil spring, lubricant that attempts to escape toward the outer periphery of the spring receiving face due to the coil spring being in sliding contact with the spring receiving face can be retained in the second groove, lubricant can be circulated evenly in the peripheral direction of the spring receiving face by means of the second groove, and it is possible to reliably supply lubricant to the area of the coil spring that is in sliding contact with the spring receiving face.

Furthermore, in accordance with the fifth aspect of the present invention, since the drain hole is provided at a location, closest to the ground, of the spring housing part provided on the bracket connected to the outer peripheral edge of the spring receiving face at right angles and housing the coil spring, the majority of the water that enters the spring housing part and travels on the inner peripheral face of the spring housing part can be discharged from the drain hole before reaching the spring receiving face, and it is possible to suppress lubricant from being discharged together with the water, thereby preventing as far as possible lubricant from flowing out from the area of the coil spring that is in sliding contact.

EXPLANATION OF REFERENCE NUMERALS AND SYMBOLS

5 Side door
8 Bracket
10 Support seat
11 Support shaft
12 Bearing part
13 Click mechanism
14 Spring receiving member
15 Spring receiving face
16 Coil spring
23 Spring housing part
31 Lubricant reservoir
32 First groove
33 Second groove
34 Drain hole
V Vehicle Modes for Carrying out the Invention A mode for carrying out the present invention is explained below by reference to the attached FIG. 1 to FIG. 4.

Embodiment 1

Figure 1:
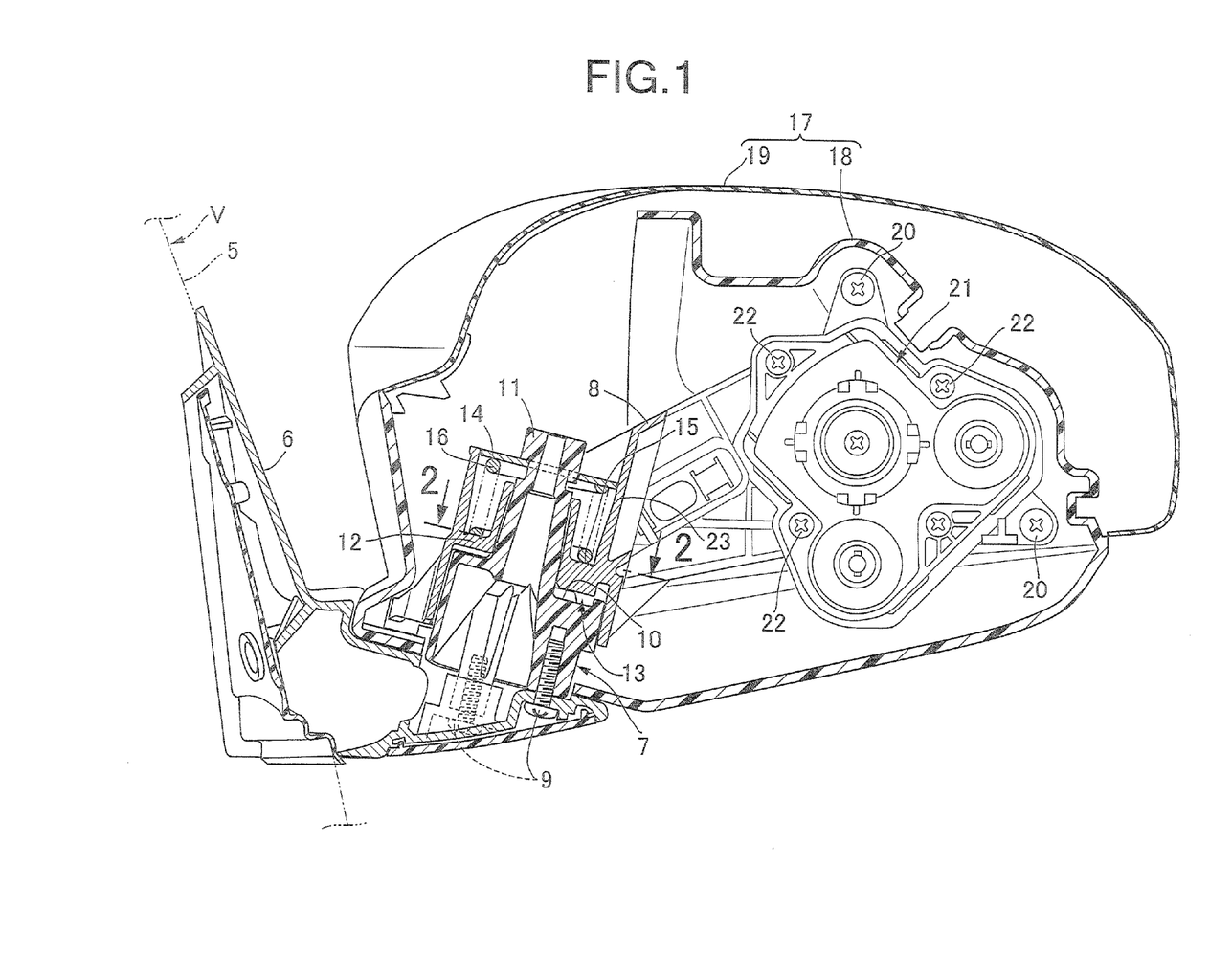
FIG. 1 is a vertical sectional view of a door mirror. (first embodiment)

First, in FIG. 1, an upward facing support seat 10 and a support shaft 11 rising from the support seat 10 are fixedly provided on a side door 5 side of a passenger vehicle V, a click mechanism 13 for imparting a click feel to pivoting of a bracket 8 supporting a mirror, which is not illustrated, is provided between opposing faces of the support seat 10 and a bearing part 12 that is provided on the bracket 8 and pivotably supported on the support shaft 11, and a coil spring 16 is provided in a compressed state between a spring receiving member 14 fixed to the support shaft 11 and a flat spring receiving face 15 formed on a face of the bearing part 12 on the side opposite to the support seat 10, the coil spring 16 pressing the bearing part 12 toward the support seat 10 side.

A base 6 is mounted on the side door 5, and a support member 7 is mounted on this base 6 by means of a plurality of screw members 9. The upward facing support seat 10 and the support shaft 11 rising upward from the support seat 10 are provided on this support member 7, and the support member 7 having the support seat 10 and the support shaft 11 is fixedly provided on the side door 5 via the base 6.

The bracket 8 is covered by a housing 17; this housing 17 is formed from a housing main portion 18 made of a synthetic resin, forming a window facing the mirror, and mounted on the bracket 8 by means of a plurality of screw members 20, and a cover 19 made of a synthetic resin and engaged with and linked to the housing main portion 18. An electric actuator 21 housed within the housing 17 is secured to the bracket 8 by means of a plurality of screw members 22, and the mirror is driven so as to be tilted in the fore-and-aft and left-and right directions by means of the electric actuator 21.

Figure 2:
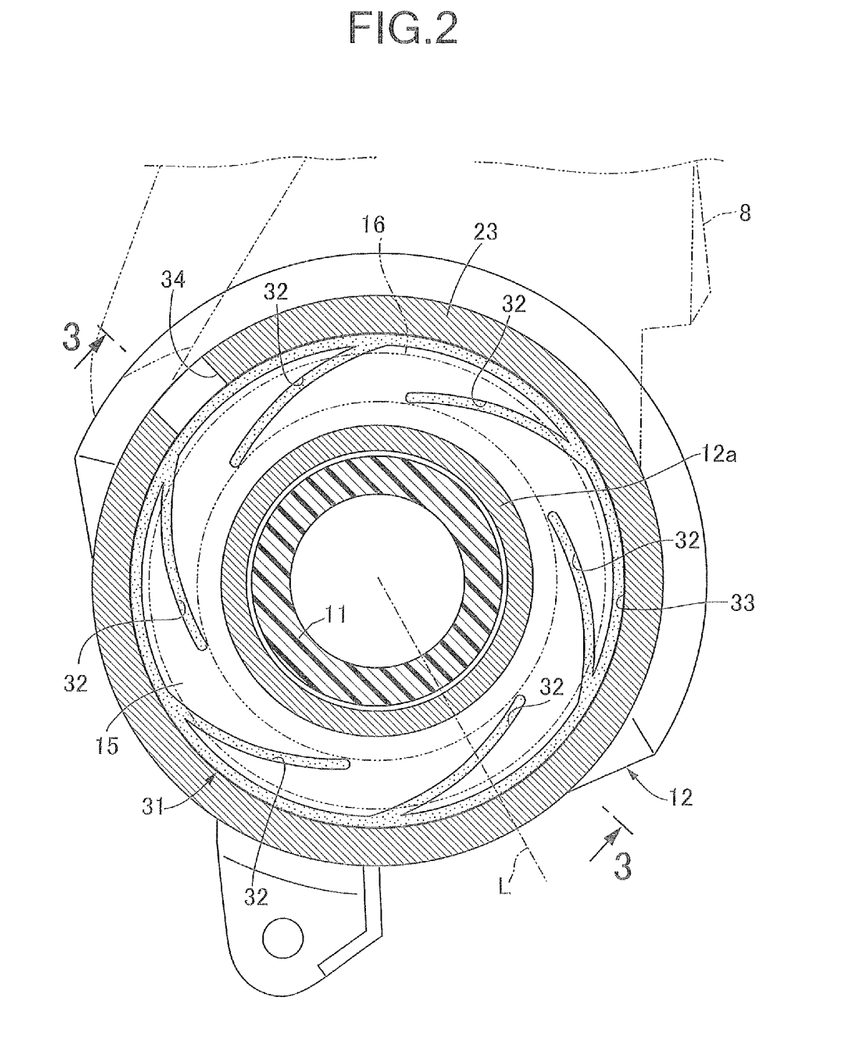
FIG. 2 is an enlarged sectional view along line 2-2 in FIG. 1. (first embodiment)
Figure 3:
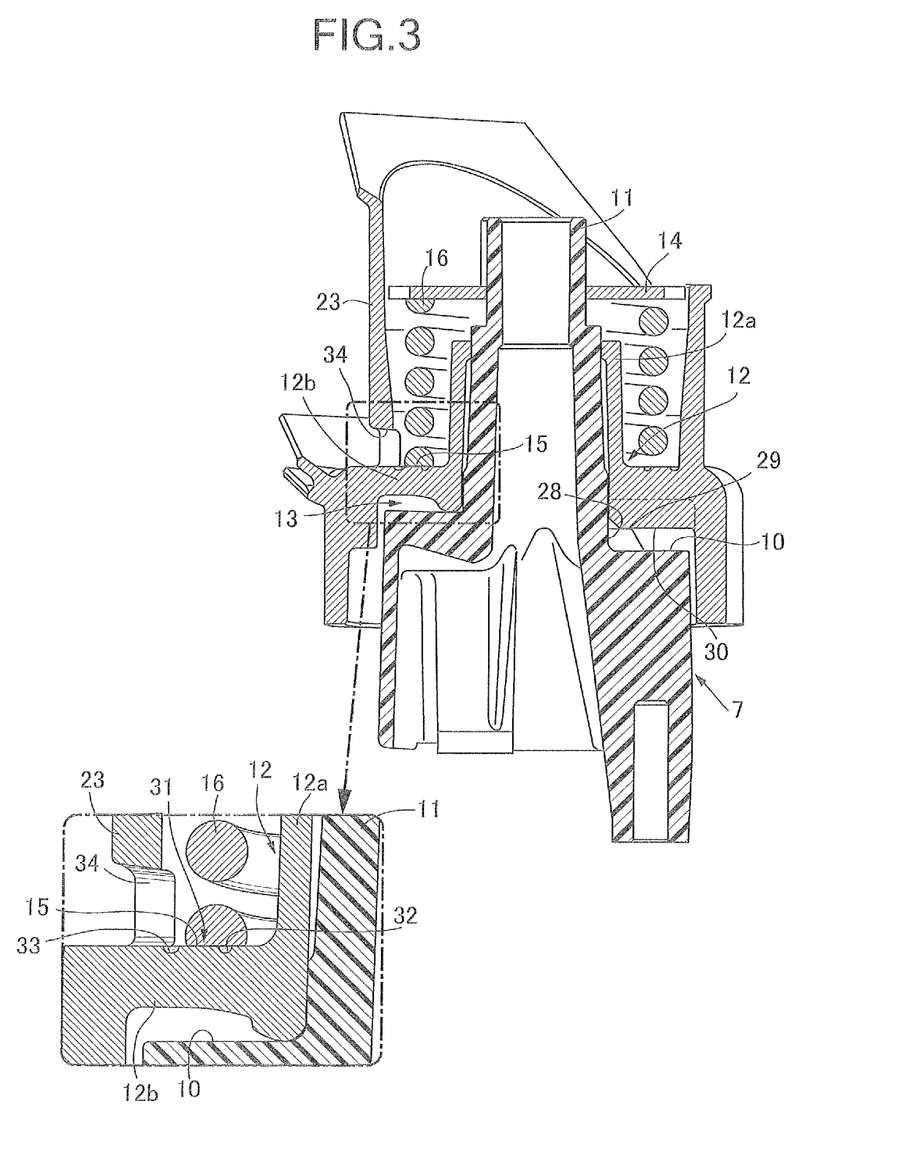
FIG. 3 is a sectional view along line 3-3 in FIG. 2. (first embodiment)

Referring in addition to FIG. 2 and FIG. 3, the bearing part 12 provided on the bracket 8 integrally has a tubular portion 12a surrounding the support shaft 11 and a collar portion 12b protruding radially outward from a base of the tubular portion 12a so as to oppose the support seat 10, and the flat spring receiving face 15 is formed on an upper face of the collar portion 12b. Furthermore, a tubular spring housing part 23 is integrally provided with the bracket 8, the spring housing part 23 being connected to the outer peripheral edge of the spring receiving face 15 at right angles and extending upward, and the coil spring 16 is housed within the spring housing part 23.

Figure 4:
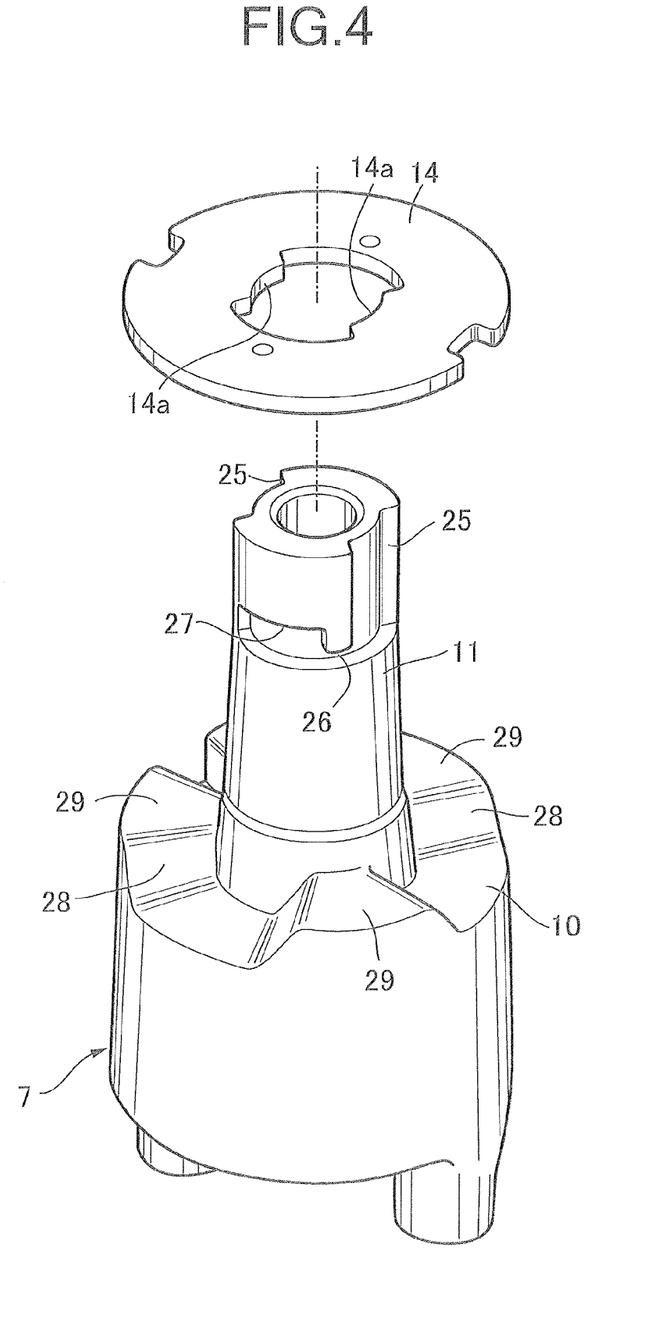
FIG. 4 is an exploded perspective view of a support shaft and a spring receiving member. (first embodiment)

Referring in addition to FIG. 4, the coil spring 16 is provided in a compressed state between the spring receiving face 15 and the spring receiving member 14 fixed to an extremity part of the support shaft 11. The spring receiving member 14 is formed into a ring plate shape from metal while having engagement projection portions 14a and 14a protruding radially inward at two positions equally spaced in the peripheral direction of an inner peripheral part. On the other hand, provided on the outer periphery of the extremity part of the support shaft 11 are a pair of fitting grooves 25 and 25 extending in the axial direction so as to make the spring receiving member 14 move in the axial direction by fitting the pair of engagement projection portions 14a thereinto and having an outer end part opening at the extremity of the support shaft 11, a pair of guide grooves 26 having one end in the peripheral direction connected to the inner end of the fitting grooves 25 and guiding the engagement projection portions 14a from the inner end of the fitting grooves 25 toward the other side in the peripheral direction, and a pair of engagement recess parts 27 recessed from the other end of the guide grooves 26 toward the extremity side of the support shaft 11 so as to make the engagement projection portions 14a engage therewith. After the engagement projection portions 14a of the spring receiving member 14 in a state in which the coil spring 16 is present between itself and the spring receiving face 15 are fitted into the two fitting grooves 25, moved to their inner end parts, and then displaced in the peripheral direction toward the engagement recess parts 27 side, and the spring receiving member 14 is thereby engaged with the support shaft 11. The two engagement projection portions 14a are engaged with the two engagement recess parts 27 by means of the spring force exhibited by the coil spring 16, and the spring receiving member 14 is thereby substantially fixed to the support shaft 11.

The click mechanism 13 imparts a click feel when the bracket 8, that is, the mirror, pivots between a raised position in which it projects sideways from the side door 5, a forward retracted position in which it pivots from the raised position toward the front of the passenger vehicle V and is close to the side door 5, and a rearward retracted position in which it pivots from the raised position toward the rear of the passenger vehicle V and is close to the side door 5, and is provided between the support seat 10 and the collar portion 12b of the bearing part 12.

Referring in addition to FIG. 4, the click mechanism 13 is formed from a plurality of trapezoidal peaks 29 disposed at intervals on the periphery of the support shaft 11 and provided on the support seat 10 so as to form valleys 28 therebetween, and three fitting projections 30 provided integrally with the collar portion 12b of the bearing part 12 while having a shape that can be fitted into each of the valleys 28, and the collar portion 12b is urged toward the side on which it moves closer to the support seat 10 by means of the spring force exhibited by the coil spring 16.

In such a click mechanism 13, in a state in which each of the fitting projections 30 is fitted into each of the valleys 28, the raised position, the forward retracted position, or the rearward retracted position of the bracket 8 and the mirror is retained. Furthermore, since pivoting of the bracket 8 and the mirror from the raised position to the forward retracted position or the rearward retracted position becomes possible by each of the fitting projections 30 passing over each of the peaks 29 against the spring force of the coil spring 16, it is possible to impart a click feel to pivoting of the bracket 8 and the mirror between the raised position and the forward retracted position and pivoting of the bracket 8 and the mirror between the raised position and the rearward retracted position.

A lubricant reservoir 31 that can be charged with a lubricant such as a grease is formed on the spring receiving face 15 restricted by the collar portion 12b of the bearing part 12; this lubricant reservoir 31 has at least a first groove 32 that continues so that one end is disposed closer to the center of the support shaft 11 than the other end, and in this embodiment the first grooves 32 are disposed at a plurality of positions equally spaced in the peripheral direction of the spring receiving face 15.

Moreover, the first grooves 32 are formed so as to diagonally intersect a virtual line L extending radially from the center of the support shaft 11 and passing through an intermediate part of the first groove 32, and in this embodiment they are formed into a curved shape that protrudes outward in the radial direction of the spring receiving face 15.

Furthermore, the lubricant reservoir 31 is formed from a plurality of the first grooves 32 and an annular second groove 33 with which the other ends of these first grooves 32 communicate in common, the second groove 33 being formed on an outer peripheral part of the spring receiving face 15 so as to be positioned further outward than the outer periphery of the coil spring 16.

Due to the plurality of first grooves 32 being formed on the spring receiving face 15, part of the coil spring 16 does not abut against the spring receiving face 15 in a portion corresponding to the first grooves 32, but the line diameter of the coil spring 16 and the groove width of the first grooves 32 are set so that the coil spring 16 abuts directly against the spring receiving face 15 via at least 75% of the area of the coil spring 16 when projected on the spring receiving face 15 in the axial direction of the support shaft 11. By so doing, it becomes possible to avoid a local increase of the load from the coil spring 16 acting on the spring receiving face 15, prevent the collar portion 12b from being deformed, prevent a step from being generated in a portion of the first grooves 32 due to deformation of the spring receiving face 15, and prevent the terminus of the coil spring 16 from being caught by such a step.

Furthermore, a drain hole 34 for discharging water entering the interior of the spring housing part 23 is provided in a location, closest to the ground, of the spring housing part 23 in a state in which the bracket 8 is supported on the support shaft 11.

The operation of this embodiment is now explained: since the lubricant reservoir 31 formed on the spring receiving face 15 has at least the first groove 32, which continues so that one end is disposed closer to the center of the support shaft 11 than the other end, regardless of displacement of the coil spring 16 caused by rattling between the bracket 8 and the coil spring 16, lubricant can be always supplied to the area of the coil spring 16 that is in sliding contact with the spring receiving face 15, friction between the spring receiving face 15 and the coil spring 16 decreases, and the occurrence of an abnormal noise caused by rubbing of the spring receiving face 15 and the coil spring 16 can be prevented.

Furthermore, since the first groove 32 is formed so that it diagonally intersects the virtual line L passing through the intermediate part of the first groove 32 and extending radially from the center of the support shaft 11, if in the worst case the terminus of the coil spring 16 is caught by the first groove 32, it is possible to prevent the generation of an abnormal noise when the coil spring 16 returns by virtue of the spring reaction force. That is, when the first groove 32 is one that lies along the virtual line L extending radially from the center of the support shaft 11, if the terminus of the coil spring 16 is caught by the first groove 32 during pivoting of the bracket 8, there is a possibility that an abnormal noise will be generated when the coil spring 16 returns by virtue of the spring reaction force, but since the first groove 32 diagonally intersects the virtual line L extending radially from the center of the support shaft 11, even if the terminus of the coil spring 16 is caught by the first groove 32, the resistance force is dispersed and it is easily released, and it is therefore possible to suppress twisting of the coil spring 16 due to it being caught, reduce the spring reaction force, and prevent the occurrence of an abnormal noise when the coil spring 16 returns.

Moreover, since the first groove 32 has a curved shape, compared with a case in which the first groove 32 has a straight line shape the length of the first groove 32 is made longer, a larger amount of lubricant can be charged, and flowing out of the lubricant can be suppressed more effectively.

Furthermore, since the lubricant reservoir 31 is formed from the plurality of first grooves 32 disposed at a plurality of positions spaced in the peripheral direction of the spring receiving face 15 and the annular second groove 33 with which the other ends of the first grooves 32 are made to communicate in common, and the second groove 33 is formed on the outer peripheral part of the spring receiving face 15 so as to be positioned further outside than the outer periphery of the coil spring 16, lubricant that attempts to escape toward the outer periphery of the spring receiving face 15 can be retained in the second groove 33 by means of the coil spring 16 being in sliding contact with the spring receiving face 15, lubricant can be circulated evenly in the peripheral direction of the spring receiving face 15 by means of the second groove 33, and it is possible to reliably supply lubricant to the area of the coil spring 16 that is in sliding contact with the spring receiving face 15.

Moreover, since the tubular spring housing part 23 connected to the outer peripheral edge of the spring receiving face 15 at right angles and housing the coil spring 16 is provided on the bracket 8, and the drain hole 34 for discharging water within the spring housing part 23 is provided at a location, closest to the ground, of the spring housing part 23 in a state in which the bracket 8 is supported on the support shaft 11, the majority of the water that enters the spring housing part 23 and travels on the inner peripheral face of the spring housing part 23 can be discharged from the drain hole 34 before reaching the spring receiving face 15, and it is possible to suppress lubricant from being discharged together with the water, thereby preventing as far as possible lubricant from flowing out from the area where the coil spring 16 is in sliding contact.

A route for water to enter from the extremity of the support shaft 11 and be discharged to the drain hole 34 via an outer face of the support shaft 11, an outer face of the bearing part 12 and the spring receiving face 15 could be considered, but since the amount of water in this part is relatively small and is an amount that would not make the lubricant be discharged together therewith, it is not necessary to pay particular consideration thereto.

An embodiment of the present invention is explained above, but the present invention is not limited to the above-mentioned embodiment and may be modified in a variety of ways as long as the modifications do not depart from the spirit and scope thereof.

The invention claimed is:

1. A vehicle door mirror in which an upward facing support seat (10) and a support shaft (11) rising from the support seat (10) are fixedly provided on a side door (5) side of a vehicle (V), a click mechanism (13) is provided between opposing faces of the support seat (10) and a bearing part (12) provided on a bracket (8) supporting a mirror and pivotably supported on a base of the support shaft (11), the click mechanism (13) imparting a click feel to pivoting of the bracket (8), a coil spring (16) is provided in a compressed state between a spring receiving member (14) fixed to the support shaft (11) and a flat spring receiving face (15) formed on a face, on the opposite side to the support seat (10), of the bearing part (12), the coil spring (16) pressing the bearing part (12) toward the support seat (10) side, and a lubricant reservoir (31) for storing a lubricant is formed on the spring receiving face (15), characterized in that the lubricant reservoir (31) has at least a first groove (32) that continues so that one end thereof is disposed closer to the center of the support shaft (11) than the other end.

2. The vehicle door mirror according to claim 1, wherein the first groove (32) is formed so that a virtual line extending radially from the center of the support shaft (11) diagonally intersects an intermediate part of the first groove (32).

3. The vehicle door mirror according to claim 2, wherein the first groove (32) is formed into a curved shape.

4. The vehicle door mirror according to claim 1, wherein the lubricant reservoir (31) is formed from a plurality of the first grooves (32) disposed at intervals in a peripheral direction of the spring receiving face (15), and an annular second groove (33) that said other ends of the first grooves (32) communicate with in common, and the second groove (33) is formed on an outer peripheral part of the spring receiving face (15) so as to be positioned further outside than an outer periphery of the coil spring (16).

5. The vehicle door mirror according to claim 1, wherein a tubular spring housing part (23) is provided on the bracket (8), the spring housing part (23) being connected to an outer peripheral edge of the spring receiving face (15) at right angles and housing the coil spring (16), and a drain hole (34) for draining water within the spring housing part (23) is provided at a location, closest to the ground, of the spring housing part (23) in a state in which the bracket (8) is supported on the support shaft (11).

6. The vehicle door mirror according to claim 4, wherein a tubular spring housing part (23) is provided on the bracket (8), the spring housing part (23) being connected to an outer peripheral edge of the spring receiving face (15) at right angles and housing the coil spring (16), and a drain hole (34) for draining water within the spring housing part (23) is provided at a location, closest to the ground, of the spring housing part (23) in a state in which the bracket (8) is supported on the support shaft (11).

7. The vehicle door mirror according to claim 2, wherein a tubular spring housing part (23) is provided on the bracket (8), the spring housing part (23) being connected to an outer peripheral edge of the spring receiving face (15) at right angles and housing the coil spring (16), and a drain hole (34) for draining water within the spring housing part (23) is provided at a location, closest to the ground, of the spring housing part (23) in a state in which the bracket (8) is supported on the support shaft (11).

8. The vehicle door mirror according to claim 3, wherein a tubular spring housing part (23) is provided on the bracket (8), the spring housing part (23) being connected to an outer peripheral edge of the spring receiving face (15) at right angles and housing the coil spring (16), and a drain hole (34) for draining water within the spring housing part (23) is provided at a location, closest to the ground, of the spring housing part (23) in a state in which the bracket (8) is supported on the support shaft (11).

9. The vehicle door mirror according to claim 2, wherein the lubricant reservoir (31) is formed from a plurality of the first grooves (32) disposed at intervals in a peripheral direction of the spring receiving face (15), and an annular second groove (33) that said other ends of the first grooves (32) communicate with in common, and the second groove (33) is formed on an outer peripheral part of the spring receiving face (15) so as to be positioned further outside than an outer periphery of the coil spring (16).

10. The vehicle door mirror according to claim 3, wherein the lubricant reservoir (31) is formed from a plurality of the first grooves (32) disposed at intervals in a peripheral direction of the spring receiving face (15), and an annular second groove (33) that said other ends of the first grooves (32) communicate with in common, and the second groove (33) is formed on an outer peripheral part of the spring receiving face (15) so as to be positioned further outside than an outer periphery of the coil spring (16).

* * * * *